(12) United States Patent
Montemor et al.

(10) Patent No.: US 9,476,136 B2
(45) Date of Patent: Oct. 25, 2016

(54) ELECTRODEPOSITION PROCESS OF NICKEL—COBALT COATINGS WITH DENDRITIC STRUCTURE

(71) Applicants: Instituto Superior Tecnico, Lisbon (PT); Instituto Politécnico De Setúbal, Setúbal (PT); Instituto Superior De Engenharia De Lisboa, Lisbon (PT)

(72) Inventors: Maria de Fátima Grilo da Costa Montemor, Marinhais (PT); Maria João Pedroso Carmezim, Lisbon (PT); Rui Pedro Tavares da Silva, Lisbon (PT); Sónia C. da Conceição de Matos Eugenio, Santo Antonio Cavaleiros (PT); Maria Teresa Oliveira de Moura e Silva, Lisbon (PT)

(73) Assignees: INSTITUTO SUPERIOR TECNICO, Lisbon (PT); INSTITUTO POLITÉCNICO DE SETÚBAL, Setúbal (PT); INSTITUTO SUPERIOR DE ENGENHARIA DE LISBOA, Lisbon (PT)

( * ) Notice: Subject to any disclaimer, the term of this patent is extended or adjusted under 35 U.S.C. 154(b) by 39 days.

(21) Appl. No.: 14/417,393

(22) PCT Filed: Jul. 26, 2013

(86) PCT No.: PCT/PT2013/000049
§ 371 (c)(1),
(2) Date: Jan. 26, 2015

(87) PCT Pub. No.: WO2014/017937
PCT Pub. Date: Jan. 30, 2014

(65) Prior Publication Data
US 2015/0247252 A1    Sep. 3, 2015

(30) Foreign Application Priority Data

Jul. 27, 2012 (PT) .......................................... 106470

(51) Int. Cl.
C25D 5/16 (2006.01)
C25D 5/18 (2006.01)
(Continued)

(52) U.S. Cl.
CPC . C25D 5/18 (2013.01); C25D 3/12 (2013.01); C25D 3/562 (2013.01); C25D 5/16 (2013.01);
(Continued)

(58) Field of Classification Search
CPC ............ C25D 5/18; C25D 3/12; C25D 5/16; C25D 3/562; H01G 11/68; H01G 11/04
USPC .................................................. 205/102, 111
See application file for complete search history.

(56) References Cited

U.S. PATENT DOCUMENTS 4,038,158 A * 7/1977 Bursey .................... H01J 49/16
204/DIG. 9
4,412,892 A * 11/1983 Chen ........................ C25F 3/02
205/216

(Continued)

OTHER PUBLICATIONS

Bai et al. "Composition controlling of Co—Ni and Fe—Co alloys using pulse-reverse electroplating through means of experimental strategies" Electrochimica Acta 50 (2005) 1335-1345.*
Fan et al. "Study of Anomalous Nickel—Cobalt Electrodeposition with Different Electrolytes and Current Densities" Electrochmico Acta. vol. 41. No. 10. pp. 1713-1719. 1996.*
Hu et al. "Ideally Pseudocapacitive Behavior of Amorphous Hydrous Cobalt—Nickel Oxide Prepared by Anodic Deposition" Electrochemical and Solid-State Letters, 5 (3) A43-A46 (2002).*
(Continued)

*Primary Examiner* — Bryan D. Ripa
(74) *Attorney, Agent, or Firm* — Porzio, Bromberg & Newman, P.C.

(57) ABSTRACT

The present invention refers to an electrodeposition process of nickel-cobalt coatings (2), from aqueous solutions containing nickel and cobalt salts, by applying a pulsed waveform in the cathodic current range. It also refers to nickel-cobalt coatings (2), obtained by this process in a substrate (1), having a dendritic structure (4) supported by a base-layer (3) at the interface with the substrate, and being thus mechanically stable. Such nickel-cobalt coatings (2) have application in energy storage and conversion areas.

10 Claims, 1 Drawing Sheet

(51) Int. Cl.
- C25D 3/56 (2006.01)
- H01G 11/46 (2013.01)
- H01G 11/86 (2013.01)
- C25D 7/00 (2006.01)
- C25D 3/12 (2006.01)
- H01G 9/00 (2006.01)
- H01G 11/04 (2013.01)
- H01G 11/30 (2013.01)
- H01G 11/68 (2013.01)
- H01G 11/28 (2013.01)

(52) U.S. Cl.
CPC ............ *C25D 7/001* (2013.01); *H01G 9/0029* (2013.01); *H01G 11/04* (2013.01); *H01G 11/30* (2013.01); *H01G 11/46* (2013.01); *H01G 11/68* (2013.01); *H01G 11/86* (2013.01); *H01G 11/28* (2013.01); *Y02E 60/13* (2013.01)

(56) References Cited

U.S. PATENT DOCUMENTS 5,385,660 A * 1/1995 Herbert .................... C25D 1/20
  205/111
6,478,943 B1 * 11/2002 Lasia ....................... C25D 5/16
  205/104

OTHER PUBLICATIONS

Rafailovic et al. "Study of the Dendritic Growth of Ni—Co Alloys Electrodeposited on Cu Substrates" Journal of The Electrochemical Society, 157 (5) D295-D301 (2010).*

Zhang et al. "Progress of electrochemical capacitor electrode materials: A review" International Journal of Hydrogen Energy 34 (2009) 4889-4899.*

* cited by examiner

ELECTRODEPOSITION PROCESS OF NICKEL—COBALT COATINGS WITH DENDRITIC STRUCTURE

FIELD OF INVENTION

1. Technical Field of the Invention

The present invention refers to an electrodeposition process for transition metal coatings from the fourth period, in particular, nickel-cobalt (Ni—Co) with a dendritic porous structure supported by a continuous layer, in conductive substrates, from aqueous solutions of divalent nickel salt and divalent cobalt salt by application of a pulsed current wave in the cathodic regime. The nickel-cobalt coatings (2) deposited in such a way present adequate properties for application as supercapacitor electrodes for energy storage.

2. Background of the Invention

Nickel-cobalt alloys have a wide range of technological applications and are particularly interesting due to their magnetic properties along with a high corrosion and temperature resistance. Currently, these alloys have important applications such as electrode materials for energy storage and conversion devices. Recently, nickel-cobalt coatings have been proposed as electrode materials for supercapacitors due to their multiple oxidation states and high theoretical specific capacitance [1-2]. The electrochemical response of these materials can be substantially improved if they have a tridimensional porous structure that promotes a higher surface area and improves the access of ions and electrons to the active surface. The combination of a high surface area with the redox processes corresponding to alterations in the oxidation state of the metallic cations will allow high energy storage capacities in both alkaline and acidic medium. The surface area and porosity of the metallic coatings can be considerably improved if they are produced with foam-like or dendritic morphologies. Dendrites are tridimensional structures formed by a main stem from which primary arms irradiate that may contain secondary arms, forming a structure similar to a tree.

Among the various techniques available for the production of metallic coatings, electrodeposition stands out due to its versatility and economic viability. Electrodeposition allows tuning the properties of the deposited films (morphology, chemical composition, porosity, thickness) by varying the deposition parameters such as composition and pH of the electrolytic solution, current density and waveform.

There is a large number of patents and scientific papers that describe electrodeposition methods of nickel-cobalt coatings [3]. For example, U.S. Pat. No. 4,053,373 by McMullen [4], U.S. Pat. No. 4,069,112 by Harbulak [5] and U.S. Pat. No. 4,565,611 by Wagner [6] describe electrodeposition processes of nickel-cobalt alloys from aqueous solutions containing nickel sulfate, cobalt sulfate, boric acid and several additives in order to obtain bright coatings with a uniform thickness and high ductility. U.S. Pat. No. 4,565,611 by Walter [7] describes an electrodeposition process for nickel-cobalt alloys from electrolyte solutions containing nickel sulfamate, cobalt sulfamate, boric acid and a wetting agent. The deposition process is carried out under strong stirring, resulting in alloys with a high mechanical resistance, containing 35 and 55% of cobalt.

U.S. Pat. No. 6,036,833 by Tang [8] and U.S. Pat. No. 6,790,332 by Ewald [9] describe the electrodeposition of nickel-cobalt alloys by applying alternating pulses of anodic and cathodic current.

U.S. Pat. No. 6,036,833 by Tang [8] refers several electrolytic solutions containing sulfonated naphthalene as additive, allowing the deposition of nickel-cobalt alloys free of internal stresses. In the process described by Ewald [9] the ratio between the anodic and the cathodic current densities is kept between 1 and 1.5, aiming at highly soldering, uniform and compact coatings.

U.S. Pat. No. 4,555,317 by Nicolas [10] describes the fabrication of an active surface, formed by a nickel substrate and a dendritic porous coating. This coating is electrodeposited from an electrolyte solution containing nickel oxide or cobalt oxide. This patent [10] does not refer the co-deposition or simultaneous deposition of the two metals, being only described the fabrication of dendritic coatings of nickel or cobalt for application as cathodes for hydrogen production. On the other hand, electrodeposition of said dendritic coatings is only performed in nickel substrates or other nickel-coated substrates and its applicability is not demonstrated for other substrates.

Another pulsed electrodeposition process is described in US Patent Application 20110083967 by Ruan [11], with the aim of producing aluminum-manganese alloys from non-aqueous solutions. In this process, applied to ionic liquids, different current waveforms may be used, containing cathodic pulses, off-time and/or anodic pulses, with a typical duration between 0.2 and 2000 ms.

In what concerns scientific publications, only a limited number of papers refers the simultaneous electrodeposition of nickel-cobalt with dendritic structure, most of which aim at producing disperse deposits or powders [12-14].

Jovic et al. [12] describe the formation of nickel-cobalt powders, by galvanostatic deposition, in glassy carbon substrates from electrolytes containing nickel sulfate, cobalt sulfate and ammonium sulfate. The authors have obtained nickel-cobalt powders with dendritic structure by applying a current density of $-500$ $mA/cm^2$ in a solution with a nickel-cobalt molar ratio of 1.5.

In a similar study, Maksimović et al. [13] have analyzed the electrodeposition of nickel-cobalt powders on glassy carbon substrates from electrolytes containing nickel sulfate, cobalt sulfate, boric acid and ammonium sulfate by the application of a constant current density of $-70$ $mA/cm^2$. The authors have developed powders with bidimensional dendritic structure in solutions with nickel-cobalt molar ratio of 1.

Rafailović et al. [14] have studied the microstructure of disperse deposits of nickel-cobalt alloys on copper substrates obtained by galvanostatic deposition from electrolyte solutions containing nickel sulfate, cobalt sulfate, ammonium chloride and ammonium hydroxide. Disperse deposits with a dendritic structure were obtained when the nickel-cobalt ratio in solution was 2 by applying a constant current density of $-65$ $mA/cm^2$.

On the other hand, using the same electrolytic solution with a nickel-cobalt molar ratio of 1, the same authors [15] have produced a nickel-cobalt coating with a porous dendritic structure on copper substrates.

However, this type of deposit could only be obtained by applying a current density of $-400$ $mA/cm^2$, which, due to the simultaneous intense hydrogen evolution, led to a significant reduction of the process current efficiency.

In the present invention, the tridimensional dendritic structures are formed under diffusional control, i.e., when the electrodeposition process is performed in the limiting diffusion current, depending on the electrolyte composition.

Dendritic growth is common during electrodeposition of metals and alloys when the applied current is with the diffusion limiting current range. However, dendrites thus obtained do not show mechanical stability and are therefore a detrimental effect during electrodeposition.

In the present invention, electrodeposition of the nickel-cobalt coatings (2) is performed in conductive substrates (1) from an electrolytic solution containing nickel chloride, cobalt chloride and boric acid. The nickel-cobalt coatings (2) may be deposited on stainless steel substrates (1), which present a low cost, are mechanically stable and show a good corrosion resistance.

The morphology of the coating is controlled by using a pulsed cathodic current wave with different intensities. In this way, it is possible to obtain nanostructured compact coatings or highly porous dendritic coatings, depending on the applied current. The nickel-cobalt coatings (2) with dendritic structure (4) thus obtained are highly porous and mechanically stable, being supported by a base-layer (3) formed at the interface with the substrate (1) over which the dendritic structure (4) is formed. This structure is schematically represented in FIG. 1.

The combination of nickel chloride and cobalt chloride solution with the use of the pulsed cathodic current wave enables the fabrication of nickel-cobalt coatings (1) with a self-sustained new tridimensional dendritic structure (4) on conductive substrates using current density one order of magnitude lower than those reported in the literature [14].

The nickel-cobalt coatings (1) obtained by the process described in the present invention find important applications as electrodes for energy storage devices, in particular supercapacitors.

SUMMARY OF THE INVENTION

The present invention refers to an electrodeposition process of a nickel-cobalt coating on a substrate, in a conventional electrolytic cell comprising an electrolytic solution comprising nickel chloride, cobalt chloride and boric acid, in which solution a cathode, which is the substrate, and an anode are immersed, characterized by applying a pulsed cathodic wave current between the cathode and the anode, wherein the cathodic current upper limit is in the range of $-2$ to $-5$ mA/cm$^2$, and the cathodic current lower limit is in the range of $-15$ to $-50$ mA/cm$^2$, and the pulse duration at each of the superior and inferior cathodic current limit is in the range of 30 to 200 s.

The present invention also refers to nickel-cobalt coatings (2), obtained according to the process described above, comprising a tridimensional dendritic structure (4) supported by a base-layer (3) at the substrate (1) interface, characterized by the base-layer (3) having a thickness of 5 to 10% of the nickel-cobalt coating total thickness.

Such nickel-cobalt coatings (2) have applications in the field of energy storage and conversion, in particular as electrodes for supercapacitors.

DETAILED DESCRIPTION OF THE INVENTION

The subject of the current invention is to provide a process for the deposition of nickel-cobalt coatings (2) on conductive substrates (1) in an efficient way in which the said process comprises an anode, a cathode which is the substrate (1), the immersion of the referred anode and cathode in an electrolytic solution of divalent nickel and cobalt and the application of a pulsed cathodic current between the anode and the cathode.

It is also referred to the nickel-cobalt coatings (2), obtained by said process, in a substrate (1), having a dendritic structure (4) supported by a base-layer (3) at the substrate (1) interface, thus being mechanically stable. Such nickel-cobalt coatings (2) are suitable for energy storage and conversion applications. Divalent nickel and cobalt will be both present in the electrolytic solution in sufficient quantity to deposit the nickel-cobalt alloys on the substrate.

Surprisingly, in the present invention, it was found that the application of a pulsed cathodic current allows the electrodeposition of nickel-cobalt coatings (2), mechanically stable formed by a dendritic structure (4) and a base-layer (3), at the interface with the substrate (1), where the base-layer (3) comprises 5 to 10% of the total thickness of the nickel-cobalt coatings (2). This structure is schematically represented in FIG. 1.

Electrodeposition with pulsed current is very common, typically resulting in denser films (low porosity), homogeneous and with better adhesion to the substrate. Thus, it would not be expected that the application of a cathodic pulsed current, as described in the present invention, would have promoted the mechanical stability of the deposited film while maintaining its porosity.

Characteristically, divalent nickel will be present in a quantity to provide a nickel concentration in the electrolyte solution between 0.01 and 1 M, being preferable a sufficient quantity to provide a nickel concentration in the electrolyte solution between 0.05 and 0.25 M. Divalent cobalt will be present in a quantity to provide a cobalt concentration in the electrolyte solution between 0.01 and 1 M, being preferable a sufficient quantity to provide a cobalt concentration in the electrolyte solution between 0.05 and 0.25 M. The total concentration of metallic ions in solution should be kept between 0.02 and 2 M, being preferable a value between 0.1 and 0.5 M. The nickel to cobalt concentration ratio in solution may vary between 0.02 and 2, being preferable a ratio between 1.5 and 2.

The electrolytic solution also contains boric acid in a concentration between 0.01 a 0.5 M, preferably 0.5 M. The solution pH is kept between 3 and 7, being preferable between 5 and 6. For most operations, the electrolyte will be kept at room temperature without stirring.

The deposition of the nickel-cobalt coating (2) is performed by application of a pulsed cathodic current wave, for example square, with different intensities, as represented in FIG. 2. The upper cathodic limit, designated as $i_1$, will be in the range between $-2$ e $-5$ mA mA/cm$^2$, preferably $-3$ mA/cm$^2$. The lower cathodic limit designated as $i_2$, will be in the range between $-5$ and $-100$ mA mA/cm$^2$, preferably between $-5$ and $-10$ mA/cm$^2$ for the production of nanostructured compact coatings and between $-15$ and $-50$ mA/cm$^2$ for the production of coatings with a dendritic structure (4).

The pulse duration at each current limit varies between 30 and 200 s, being preferable a value between 50 and 100 s.

The deposition time of the nickel-cobalt coating (2) in the substrate (1) varies widely depending on parameters such as the nature of the substrate (1) and the thickness of the desired deposit. Deposition times vary between 5 and 20 minutes for to obtain coatings with 10 and 100 micrometer thick, respectively.

The cathode, which will be the substrate (1) to be coated, can be made of any material that allows passing of electric current. For example, stainless steel due to its high corrosion resistance and stability at high temperatures will be suitable for the production of supercapacitor electrodes for energy storage.

The anode may be formed by any appropriate material as long as it does not change the characteristics of the electrolytic solution and does not dissolve or disintegrate in the electrolytic solution. Platinum anodes or platinum-coated anodes may be used due to their high conductivity and chemical stability. Carbon anodes may also be used due to their high conductivity and corrosion resistance.

The nickel-cobalt coatings (2) obtained in such as way have a variable morphology depending on the applied current lower limit ($i_2$). To be applied as electrodes for supercapacitors, the most adequate morphology will be a tridimensional dendritic structure formed of a high number of metallic dendrites, or dendritic structures (4), being each dendrite formed by a central stem from which secondary arms irradiate.

In the present invention, the nickel-cobalt coatings (2) formed by electrodeposition present a dendritic structure (4) supported by a base-layer (3) at the interface with a substrate (1).

The chemical composition of the nickel-cobalt coatings (2) varies with the value of $i_2$ and the electrolyte solution composition. For electrolytic solutions with a nickel-cobalt ratio of 1.5, the application of a current square waveform of $i_2 = -3$ mA/cm$^2$ and $i_2 = -10$ mA/cm$^2$ leads to coatings with 40% of nickel. If $i_2 = -30$ mA/cm$^2$, the percentage of nickel in the deposit will be 60%. The morphology of the nickel-cobalt coatings (2) previously described presents a high thermal stability, no significant changes being detected after heat treatment at 800° C.

The process described in the present patent application is a method for obtaining dendritic deposits that, due to its innovative parameters, allows:
- a rigorous control of the deposits, both at the level of the base layer characteristics and at the dimension and shape of the dendrites,
- the elimination of anomalous deposition, since the atomic ratio of nickel-cobalt is similar in the electrolytic solution and in the deposited coating
- obtaining this type of dendritic deposits with an energy saving above 90%, in relation to current electrochemical methods.

EXAMPLES

Example 1

An aqueous electrolytic solution was prepared containing 0.04 M of nickel chloride hydrate, 0.06 M cobalt chloride hydrate and 0.5 M boric acid. The solution pH was kept at 5.5.

Example 2

Figure 1:
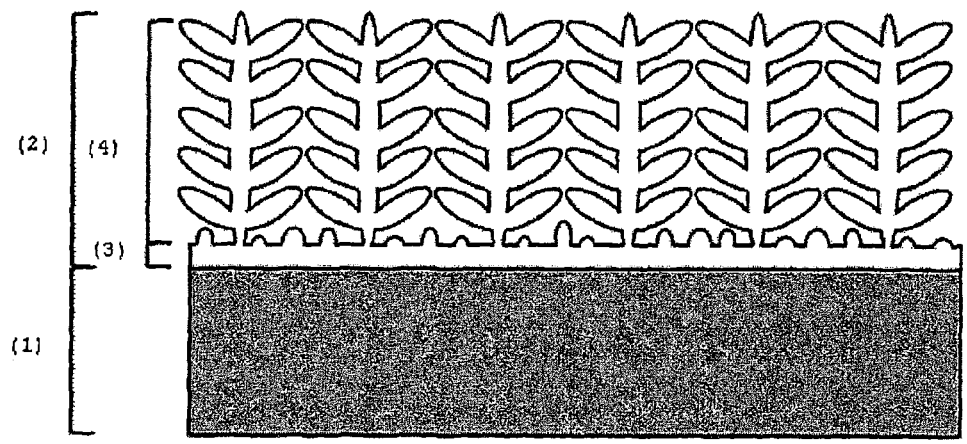
FIG. 1 schematically shows the dendritic structure of the nickel-cobalt coatings obtained in the present invention. The nickel-cobalt coatings (2) present a dendritic structure (4) supported by a base-layer (3) at the interface with a substrate (1).
Figure 2:
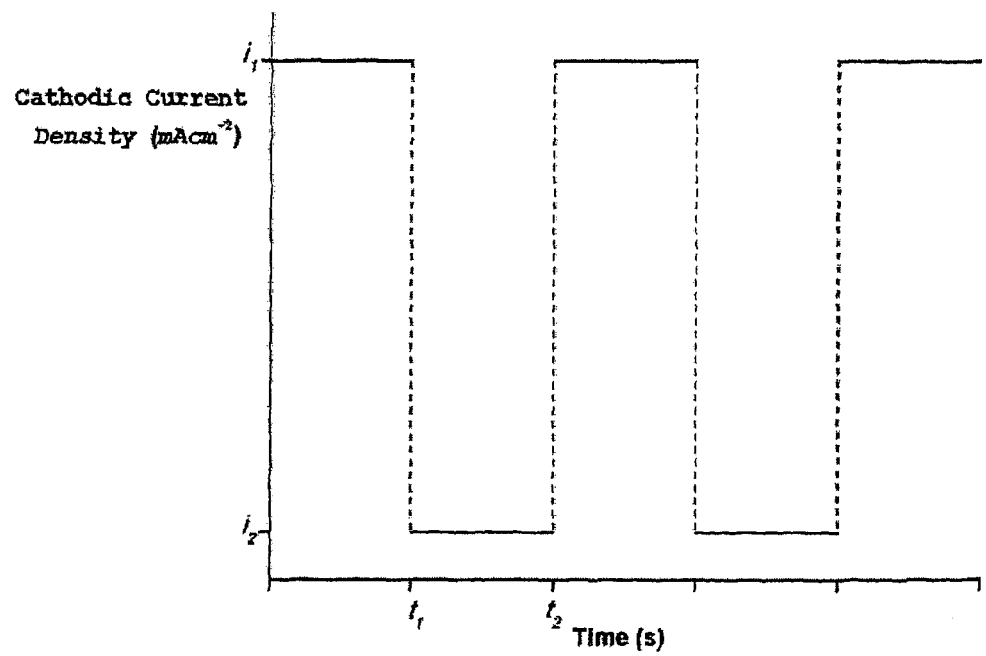
FIG. 2 schematically shows current square waveform, in the cathodic regime, applied during the electrodeposition process of nickel-cobalt coatings (2). The YY-axis refers to the current density, expressed in mA/cm$^2$ and the XX-axis refers to time, expressed in seconds.

Electrodeposition of a nickel-cobalt coating was performed on a AISI 304 stainless steel substrate (1) from an electrolytic solution described in example 1, by applying a square waveform cathodic current with a upper current limit of −3 mA/cm$^2$, a lower current limit of −20 mA/cm$^2$ in a deposition time of 1000 s. The nickel-cobalt coatings (2) thus obtained presented a dendritic structure (4) supported by a base-layer (3) at the interface with the substrate (1), as shown in FIG. 1, containing 58% of nickel and 42% of cobalt.

Example 3

Electrodeposition of a nickel-cobalt coating was performed on a AISI 304 stainless steel substrate (1) from an electrolytic solution containing 0.06 M of nickel chloride hydrate, 0.04 M cobalt chloride hydrate and 0.5 M boric acid by applying a cathodic current square wave with a cathodic current upper limit of −5 mA/cm$^2$ and a cathodic current lower limit of −35 mA/cm$^2$, with a pulse duration of 50 s and a deposition time of 1000 s. The resulting nickel-cobalt coating (2), with an average thickness of 100 micrometers, was adherent and uniform along the substrate (1) and presented a dendritic structure (4) supported by a base-layer (3), with a thickness of 5 micrometers, at the interface with the substrate (1). The nickel-cobalt coating (2) contains 60% of nickel and 40% of cobalt.

Example 4

Electrodeposition of a nickel-cobalt coating was performed on a AISI 304 stainless steel substrate (1) from an electrolytic solution containing 0.01 M of nickel chloride hydrate, 0.09 M cobalt chloride hydrate and 0.5 M boric acid by applying a cathodic current square wave with a cathodic current upper limit of −3 mA/cm$^2$ and a cathodic current lower limit of −20 mA/cm$^2$, with a pulse duration of 50 s and a deposition time of 2000 s. The resulting nickel-cobalt coating (2) was adherent and uniform along the substrate (1) with an average thickness of 100 micrometers, and presented a morphology in accordance with FIG. 1, having the base-layer (3), a thickness of 5 micrometers. In these conditions the nickel-cobalt coating (2) contains 90% of cobalt and 10% of nickel.

Example 5

Electrodeposition of a nickel-cobalt coating was performed on a AISI 304 stainless steel substrate (1) from an electrolytic solution containing 0.03 M of nickel chloride hydrate, 0.07 M cobalt chloride hydrate and 0.5 M boric acid by applying a cathodic current square wave with a cathodic current upper limit of −3 mA/cm$^2$ with 100 s duration and a cathodic current lower limit of −20 mA/cm$^2$ with 50 s duration, the deposition time being 1200 s. The resulting nickel-cobalt coating (2) was adherent and uniform along the substrate (1) with an average thickness of 80 micrometers and presented a morphology in accordance with FIG. 1, having the base-layer (3), a thickness of 5 micrometers. In these conditions the nickel-cobalt coating (2) contains 70% of cobalt and 30% of nickel.

Example 6

Electrodeposition of a nickel-cobalt coating was performed on a AISI 304 stainless steel substrate (1) from an electrolytic solution containing 0.03 M of nickel chloride hydrate, 0.07 M cobalt chloride hydrate and 0.5 M boric acid by applying a cathodic current square wave with a cathodic current upper limit of −5 mA/cm² and a cathodic current lower limit of −35 mA/cm², with a pulse duration of 50 s and a deposition time of 300 s. The resulting nickel-cobalt coating (2), with an average thickness of 20 micrometers, was adherent and uniform along the substrate (1) and presented a dendritic structure (4) supported by a base-layer (3), with a thickness of 2 micrometers, at the interface with the substrate (1), as illustrated in FIG. 1.

REFERENCES

1. Wang, G., L. Zhang, and J. Zhang, "*A review of electrode materials for electrochemical supercapacitors*" Chemical Society Reviews, 2012. 41(2): p. 797-828.
2. Zhang, Y., et al., "*Progress of electrochemical capacitor electrode materials: A review*" International Journal of Hydrogen Energy, 2009. 34(11): p. 4889-4899.
3. Orinakova, R., et al., "*Recent developments in the electrodeposition of nickel and some nickel-based alloys*" Journal of Applied Electrochemistry, 2006. 36(9): p. 957-972.
4. McMullen, W. H. and T. J. Mooney, "*Electroplating of nickel, cobalt, nickel-cobalt, nickel-iron, cobalt-iron and nickel-iron-cobalt deposits*" 4053373, 1977
5. Harbulak, E. P., "Electroplating of nickel, cobalt, mutual alloys thereof or ternary alloys thereof with iron" U.S. Pat. No. 4,069,112, Jan. 17, 1978
6. Wagner, H., K. Scharwaechter, and M. Nee, "Aqueous electrolytes and method for electrodepositing nickel-cobalt alloys" U.S. Pat. No. 4,565,611, Jan. 21, 1986
7. Walter, R. J., "Composition control of electrodeposited nickel-cobalt alloys" U.S. Pat. No. 4,439,284, Mar. 27, 1984
8. Tang, P. T., H. Dylmer, and P. Moller, "Electroplating method of forming platings of nickel" U.S. Pat. No. 6,036,833, Mar. 14, 2000
9. Ewald, R., et al., "Method for the galvanic deposition of nickel, cobalt, nickel alloys or cobalt alloys with periodic current pulses" U.S. Pat. No. 6,790,332, Sep. 14, 2004
10. Nicolas, E. and L. Merckaert, "Cathode for the electrolytic production of hydrogen and its use" U.S. Pat. No. 4,555,317, Nov. 26, 1985
11. Ruan, S. and C. A. Schuh, "Electrodeposited alloys and methods of making same using power pulses" US Patent Application 20110083967, Apr. 14, 2011
12. Jović, V. D., B. M. Jović, and M. G. Pavlović, "*Electrodeposition of Ni, Co and Ni—Co alloy powders*" Electrochimica Acta, 2006. 51(25): p. 5468-5477.
13. Maksimović, V. M., et al., "*Morphology and composition of Ni—Co electrodeposited powders*" Materials Characterization, 2011. 62(12): p. 1173-1179.
14. Rafailović, L. D., et al., "*Microstructure and mechanical properties of disperse Ni—Co alloys electrodeposited on Cu substrates*" Materials Chemistry and Physics, 2010. 120(2 3): p. 409-416.
15. Rafailovic, L. D., et al., "*Study of the dendritic growth of Ni—Co alloys electrodeposited on Cu substrates*" Journal of The Electrochemical Society, 2010. 157(5): p. D295-D301.

The invention claimed is:
1. An electrodeposition process of a nickel-cobalt coating having a dendritic structure, on a substrate, in an electrolytic cell comprising immersing a cathode, which is the substrate, and an anode into an electrolytic solution comprising nickel chloride, cobalt chloride and boric acid and applying a pulsed cathodic wave current between the cathode and the anode to deposit the nickel-cobalt coating on the substrate, wherein
the cathodic current upper limit is in the range of −2 to −5 mA/cm², and the cathodic current lower limit is in the range of −15 to −50 mA/cm², and
the pulse duration at each of the superior and inferior cathodic current limit is in the range of 30 to 200 s.
2. The process according to claim 1, wherein the concentration ratio between nickel and cobalt in the electrolytic solution is in the range of 0.02 to 2.0.
3. The process according to claim 2, wherein the concentration ratio between nickel and cobalt in the electrolytic solution is in the range of 1.5 to 2.0.
4. The process according to claim 1, wherein the total concentration of metallic ions in the electrolytic solution is in the range of 0.02 to 2.0 M.
5. The process according to claim 4, wherein the total concentration of metallic ions in the electrolytic solution is in the range of 0.1 to 0.5 M.
6. The process according to claim 1, wherein the pH of the electrolytic solution is kept in the range of 3 to 7.
7. The process according to claim 6, wherein the pH of the electrolytic solution is kept in the range of 5 to 6.
8. The process according to claim 1, wherein the pulse duration at each current limit is in the range of 50 to 100 s.
9. The process according to claim 1, wherein the deposition time of the nickel-cobalt coating on the substrate is in the range of 5 to 20 minutes.
10. The process according to claim 1, wherein the cathode is of stainless steel.

* * * * *